United States Patent
Ichikawa (10) Patent No.: US 10,768,713 B2
(45) Date of Patent: Sep. 8, 2020

(54) CHARACTER INPUT DEVICE, CHARACTER INPUT METHOD, AND CHARACTER INPUT PROGRAM

(71) Applicant: OMRON Corporation, Kyoto-shi, Kyoto (JP)

(72) Inventor: Kei Ichikawa, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 326 days.

(21) Appl. No.: 15/866,513

(22) Filed: Jan. 10, 2018

(65) Prior Publication Data

US 2018/0267621 A1 Sep. 20, 2018

(30) Foreign Application Priority Data

Mar. 15, 2017 (JP) ................................. 2017-049550

(51) Int. Cl.

| | |
|---|---|
| *G06F 3/18* | (2006.01) |
| *G06F 3/01* | (2006.01) |
| *G06F 3/023* | (2006.01) |
| *G06F 40/232* | (2020.01) |
| *G06F 40/279* | (2020.01) |
| *G06F 3/0489* | (2013.01) |

(52) U.S. Cl.
CPC ............ *G06F 3/018* (2013.01); *G06F 3/0237* (2013.01); *G06F 3/04895* (2013.01); *G06F 40/232* (2020.01); *G06F 40/279* (2020.01)

(58) Field of Classification Search
CPC .... G06F 3/018; G06F 3/0237; G06F 3/04895; G06F 17/273; G06F 17/2765
See application file for complete search history.

(56) References Cited

U.S. PATENT DOCUMENTS

| | | | |
|---|---|---|---|
| 5,754,737 A | 5/1998 | Gipson | |
| 8,904,282 B2 * | 12/2014 | Nagel | ................... G06F 3/0236 715/261 |

(Continued)

FOREIGN PATENT DOCUMENTS

| | | |
|---|---|---|
| EP | 1031913 A2 | 8/2000 |
| JP | H9-101949 A | 4/1997 |
| JP | 2004-536369 A | 12/2004 |

OTHER PUBLICATIONS

The extended European search report (EESR) dated Aug. 2, 2018 in a counterpart European patent application.

*Primary Examiner* — Henry Tsai
(74) *Attorney, Agent, or Firm* — Metrolex IP Law Group, PLLC (57) ABSTRACT

A character input device is provided with an input key determination unit, an input character processing unit and a conversion candidate processing unit. The input key determination unit determines the type of a key that is input. The input character processing unit executes an operation on an input character and finalization of the input character that is based on the input key. The conversion candidate processing unit executes learning of a conversion candidate associated with the input character. When it is detected that there was input of a delete key before finalization of the input character, the conversion candidate processing unit, as learning of the conversion candidate, sets an input character existing prior to input of the delete key as a reading of the finalized input character.

25 Claims, 7 Drawing Sheets

(56) References Cited

U.S. PATENT DOCUMENTS

| | | | |
|---|---|---|---|
| 9,030,417 B2* | 5/2015 | Oh | G06F 3/018 |
| | | | 345/169 |
| 9,043,700 B2* | 5/2015 | Rubanovich | G06F 3/0237 |
| | | | 715/256 |
| 2002/0156816 A1* | 10/2002 | Kantrowitz | G06F 17/273 |
| | | | 715/256 |
| 2004/0177179 A1 | 9/2004 | Koivuniemi | |
| 2006/0192765 A1* | 8/2006 | Lin | G06F 3/018 |
| | | | 345/171 |
| 2007/0157122 A1* | 7/2007 | Williams | G06F 3/0237 |
| | | | 715/816 |
| 2016/0253299 A1* | 9/2016 | Mese | G06F 17/24 |
| | | | 715/271 |
| 2017/0147538 A1* | 5/2017 | Gao | G06F 17/2223 |
| 2018/0060288 A1* | 3/2018 | Ito | G06F 3/0238 |
| 2019/0121533 A1* | 4/2019 | Wang | G06F 3/04895 |

* cited by examiner

| Step | Input character display unit | State |
|---|---|---|
| 11 | ありがてう| | Input (unfinalized) |
| 12 | ありが| | Character deletion (unfinalized) |
| 13 | ありがとう| | Input (unfinalized) |
| 14 | ありがとう| | Input finalization |

| Reading | ありがてう |
|---|---|
| Candidate | ありがとう |

FIG. 6

| Step | Input character display unit | State |
|---|---|---|
| 21 | ありがてう| | Input (unfinalized) |
| 22 | ありが| | Character deletion (unfinalized) |
| 23 | ありがたう| | Input (unfinalized) |
| 24 | ありが| | Character deletion (unfinalized) |
| 25 | ありがとう| | Input (unfinalized) |
| 26 | ありがとう| | Input finalization |

| Reading | ありがたう |
|---|---|
| Candidate | ありがとう |

FIG. 7

| Step | Input character display unit | State |
|---|---|---|
| 31 | ありがてい\| | Input (unfinalized) |
| 32 | ありが\| | Character deletion (unfinalized) |
| 33 | ありがたい\| | Input (unfinalized) |
| 34 | 有り難い\| | Conversion input finalization |

| Reading | ありがてい |
|---|---|
| Candidate | 有り難い |

FIG. 8

| Step | Input character display unit | State |
|---|---|---|
| 41 | うりがとう\| | Input (unfinalized) |
| 42 | \| | Full deletion |
| 43 | ありがとう\| | Input (unfinalized) |
| 44 | ありがとう\| | Input finalization |

| Reading | うりがとう |
|---|---|
| Candidate | ありがとう |

FIG. 9

| Step | Input character display unit | State |
|---|---|---|
| 51 | あらがとう| | Input (unfinalized) |
| 52 | あら|がとう | Input position movement (unfinalized) |
| 53 | あ|がとう | Character deletion (unfinalized) |
| 54 | あり|がとう | Input (unfinalized) |
| 55 | ありがとう| | Input position movement (unfinalized) |
| 56 | ありがとう| | Input finalization |

| Reading | あらがとう |
|---|---|
| Candidate | ありがとう |

FIG. 10

| Step | Input character display unit | State |
|---|---|---|
| 61 | きょおと| | Input (unfinalized) |
| 62 | きょお|と | Input position movement (unfinalized) |
| 63 | きょ|と | Character deletion (unfinalized) |
| 64 | きょう|と | Input (unfinalized) |
| 65 | 今日|と | Conversion (unfinalized) |
| 66 | 今日|と | Partial finalization |
| 67 | 今日と| | Conversion input finalization |

| Reading | きょおと |
|---|---|
| Candidate | 今日 |

FIG. 11

CHARACTER INPUT DEVICE, CHARACTER INPUT METHOD, AND CHARACTER INPUT PROGRAM

CROSS-REFERENCES TO RELATED APPLICATIONS

This application claims priority to Japanese Patent Application No. 2017-049550 filed Mar. 15, 2017, the entire contents of which are incorporated herein by reference.

FIELD

The disclosure relates to a character input technology having a conversion learning function of associating readings of characters that are input with conversion candidates.

BACKGROUND

Heretofore, learning technologies for when inputting characters have been variously proposed, as shown in JP 2004-536369T and JP H9-101949A.

With the conventional learning technologies, input characters and conversion characters that are based on the input characters are extracted. With the conventional learning technologies, input characters as readings and conversion characters as conversion candidates are associated with each other. The associated characters and conversion candidates are then stored in a conversion learning database. Thereafter, when a learned character is input, the conversion learning database is referred to, and a conversion candidate that corresponds to this character is read.

JP 2004-536369T and JP H9-101949A are examples of background art.

However, with the conventional learning technologies, input characters are not learned during character input, that is, when the input characters are not yet finalized. For example, in the case where a character is deleted during input, that is, in the case where misinput of a character arises before finalizing the input characters, the input characters are not learned. Accordingly, learning cannot be performed until the correct characters intended by the user are input.

In this case, when a similar misinput arises again, the user had to delete the character and input of the correct character again.

Accordingly, one or more embodiments may provide a character input technology that is able to register an appropriate conversion candidate, even when misinput arises.

SUMMARY

A character input device according to one or more embodiments is provided with an input key determination unit, an input character processing unit, and a conversion candidate processing unit. The input key determination unit is configured to determine a type of a key that is input. The input character processing unit is configured to execute an operation on an input character that is based on the key that is input, and finalization of the input character. The conversion candidate processing unit is configured to execute learning of a conversion candidate associated with the input character. When it is detected that the input character has been finalized, and that there was input of a delete key before finalization of the input character, the conversion candidate processing unit, as the learning of the conversion candidate, sets an input character existing prior to input of the delete key as a reading of the finalized input character.

With this configuration, an input character before the character input is finalized is set as a reading, and an input character that is finalized is set as a conversion candidate. Note that a character in one or more embodiments is intended to include both a single character and a character string consisting of a plurality of characters.

Also, with the character input device according to one or more embodiments, the conversion candidate processing unit sets, as the reading of the finalized input character, an input character existing immediately prior to a last input of the delete key before finalization of the input character.

With this configuration, the last wrong character before the character input is finalized is set as the reading.

Also, the character input device according to one or more embodiments is provided with an input history storage unit configured to store, after input finalization, an input character existing prior to input of the delete key. The conversion candidate processing unit detects whether the input character existing prior to input of the delete key matches a character in the input history storage unit, and executes learning of the conversion candidate, when a number of matches exceeds a threshold value.

With this configuration, input characters are learned when the same input mistake is repeated numerous times, that is, easily mistaken input characters are learned.

According to one or more embodiments, an appropriate conversion candidate can be registered, even when misinput of a character arises.

DETAILED DESCRIPTION

A character input technology according to one or more embodiments will be described, with reference to the drawings. Note that, as long as it is not necessity to especially discriminate, a character in one or more embodiments is intended to include both a single character and a character string consisting of a plurality of characters.

Figure 1:
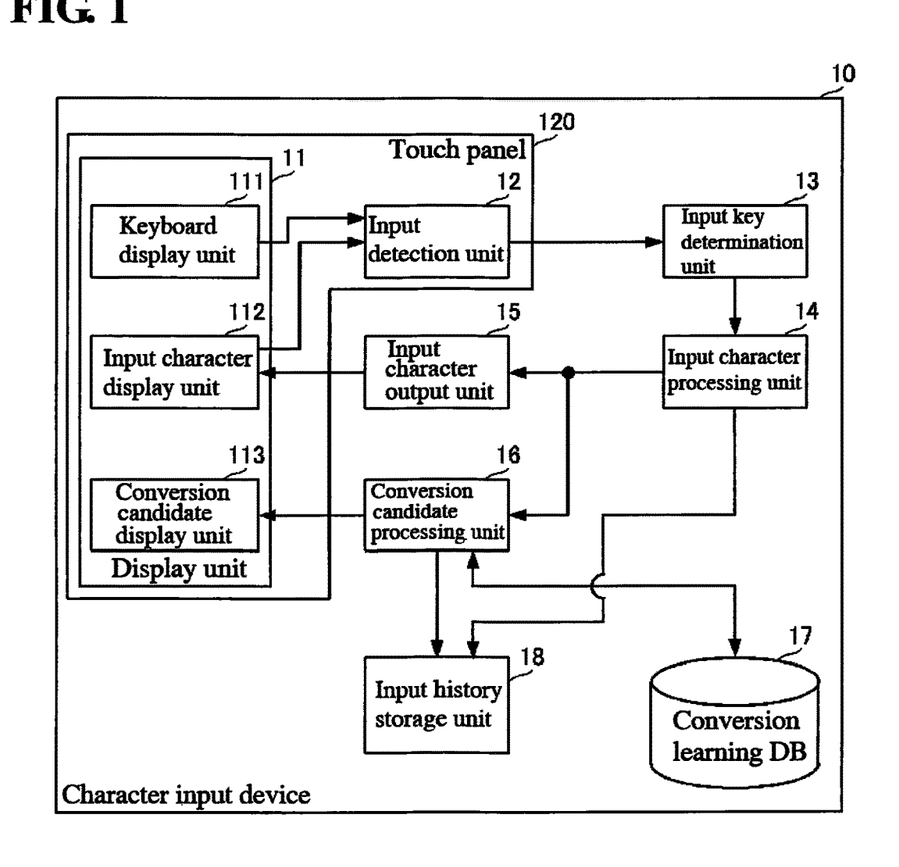
FIG. 1 is a functional block diagram illustrating a character input device according to one or more embodiments.
Figure 2:
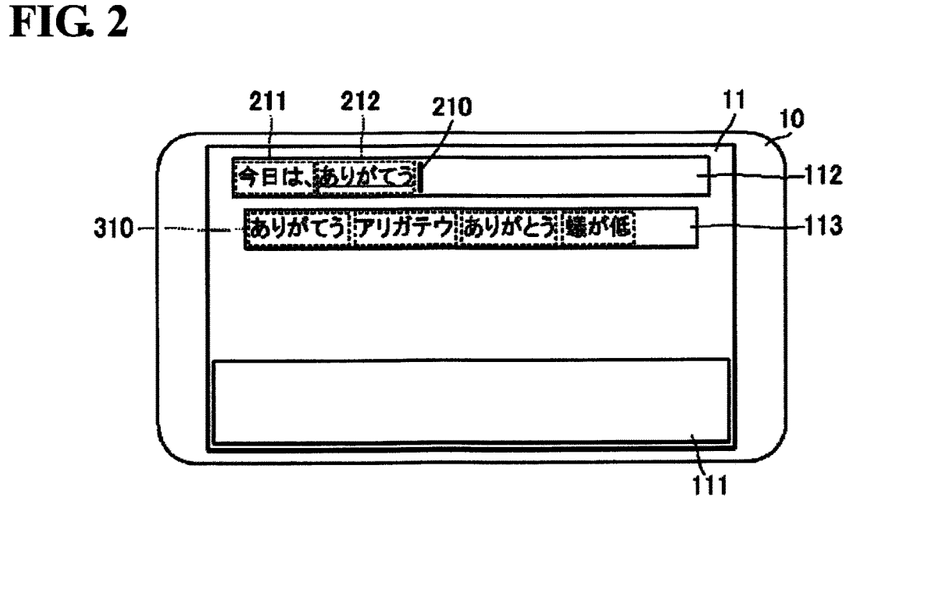
FIG. 2 is an external plan view illustrating a character input device according to one or more embodiments.

FIG. 1 is a functional block diagram of a character input device according to one or more embodiments. FIG. 2 is an external plan view of the character input device according to one or more embodiments.

As shown in FIG. 1, a character input device 10 is provided with a display unit 11, an input detection unit 12, an input key determination unit 13, an input character processing unit 14, an input character output unit 15, a conversion candidate processing unit 16, a conversion learning database (conversion learning DB) 17, and an input history storage unit 18. The display unit 11 is provided with a keyboard display unit 111, an input character display unit 112 and a conversion candidate display unit 113. The display unit 11 and the input detection unit 12 constitute a touch panel 120.

As shown in FIG. 2, the character input device 10 is an information processing terminal such as a mobile information communication terminal, for example. The character input device 10 is generally realized by an OS, programs in which various types of applications are described, and hardware that executes the OS and programs. A character input program according to one or more embodiments is included as one of these programs.

The display unit 11 is provided on the surface of the character input device 10. The keyboard display unit 111, the input character display unit 112 and the conversion candidate display unit 113 are realized on a display screen of the display unit 11.

The keyboard display unit 111 realizes a user interface portion of a so-called software keyboard. Various types of keys are displayed on the keyboard display unit 111 on the display screen. Selection of keys is realizable, by the user touching the displayed keys.

The input character display unit 112 is a portion that displays unfinalized input characters and finalized input characters. In the input character display unit 112, as shown in FIG. 2, an input finalized character 211 and an input unfinalized character 212 are identifiably displayed. For example, the input finalized character 211 is not underlined, whereas the input unfinalized character is underlined. Also, a cursor 210 showing a character input position is displayed on the input character display unit 112.

The conversion candidate display unit 113 is a portion that displays a conversion candidate 310 for an unfinalized input character. When a plurality of conversion candidates 310 are extracted, the plurality of conversion candidates 310 are displayed on the conversion candidate display unit 113 in order of priority.

The input detection unit 12 is formed by a touch sensor, which is any of an electrostatic touch sensor, a resistive touch sensor, a piezoelectric touch sensor and the like. The input detection unit 12 detects input that uses the display screen of the display unit 11 and the input position thereon. Specifically, if the keyboard display unit 111 is touched, the input detection unit 12 detects input to the keyboard display unit 111 by this touch, and detects the input position on the keyboard display unit 111. The input detection unit 12 outputs this input detection and input position to the input key determination unit 13. The input detection unit 12 also detects input to the input character display unit 112 and the input position thereon. Detection of the input position to the input character display unit 112 is utilized in movement of the cursor 210, selection of an input character, and the like. Note that the input detection unit 12 also detects input to the conversion candidate display unit 113 and the input position thereon. Detection of the input position on the conversion candidate display unit 113 is utilized in selection of a conversion candidate 310 and the like.

The input key determination unit 13 stores the key disposition of the keyboard display unit 111 and the area within the keyboard display unit 111 allocated to each key. The input key determination unit 13 determines the type of input key from the input position. The input key determination unit 13 outputs the determination result of the type of input key to the input character processing unit 14. In other words, the input key determination unit 13 detects a key event, and outputs the detected key event to the input character processing unit 14.

The input character processing unit 14 executes an operation on characters such as addition or deletion of characters, based on the key event, and forms an input character. For example, if character keys are successively input, the input character processing unit 14 arranges each character in the order in which the character was input, and forms an input character. If a key event of a delete key is input, the input character processing unit 14 deletes a character to form a new input character. Deletion of a character, if one character, involves deleting that character, and if a character string, involves deleting one character or a plurality of characters in the character string.

The input character processing unit 14 performs processing with the input character as unfinalized, until processing for finalizing the input character is performed by a key event or the like, and as a finalized input character, if processing for finalizing the input character is performed.

Whenever an input character is formed by a key event, the input character processing unit 14 outputs the formed input character to the input character output unit 15 and the conversion candidate processing unit 16. That is, whenever an input character is updated, the input character processing unit 14 outputs the updated input character to the input character output unit 15 and the conversion candidate processing unit 16, irrespective of whether the input character is unfinalized or finalized.

The input character processing unit 14, when a key event of the delete key is input, stores the input character immediately before being deleted in the input history storage unit 18.

The input character output unit 15 displays an input character on the input character display unit 112. At this time, the input character output unit 15 displays the input character on the input character display unit 112 so as to be underlined if an unfinalized character, and displays the input character on the input character display unit 112 without being underlined if a finalized character.

The conversion candidate processing unit 16, when an input character is acquired, searches the conversion learning database 17 for conversion candidates 310 of the input character. The conversion candidate processing unit 16 extracts the conversion candidates 310, and displays the extracted conversion candidates 310 on the conversion candidate display unit 113.

The conversion candidate processing unit 16 executes conversion learning that associates an input character that was stored in the input history storage unit 18 when an unfinalized character with an input character that was finalized by a finalization key event after a key event of the delete key in the series of character input processing including that input character. Specifically, the conversion candidate processing unit 16 sets this finalized input character as a conversion candidate 310 and the unfinalized input character stored in the input history storage unit 18 as a reading, and associates these input characters with each other. The conversion candidate processing unit 16 registers the associated finalized input character and unfinalized input character stored in the input history storage unit 18 in the conversion learning database 17.

As a result of a configuration and processing such as described above, the character input device 10 is able to register an appropriate conversion candidate 310 in the conversion learning database 17, even when misinput of a character arises.

Also, as a result of a configuration and processing such as described above, the character input device 10 is, after this registration in the conversion learning database 17, able to extract, as a conversion candidate 310, the correct input character in the case where the misinput did not occur, even with the input character existing prior to the event of the delete key, that is, the input character that was misinput. The character input device 10 is then able to display this conversion candidate 310 on the conversion candidate display unit 113.

Figure 3:
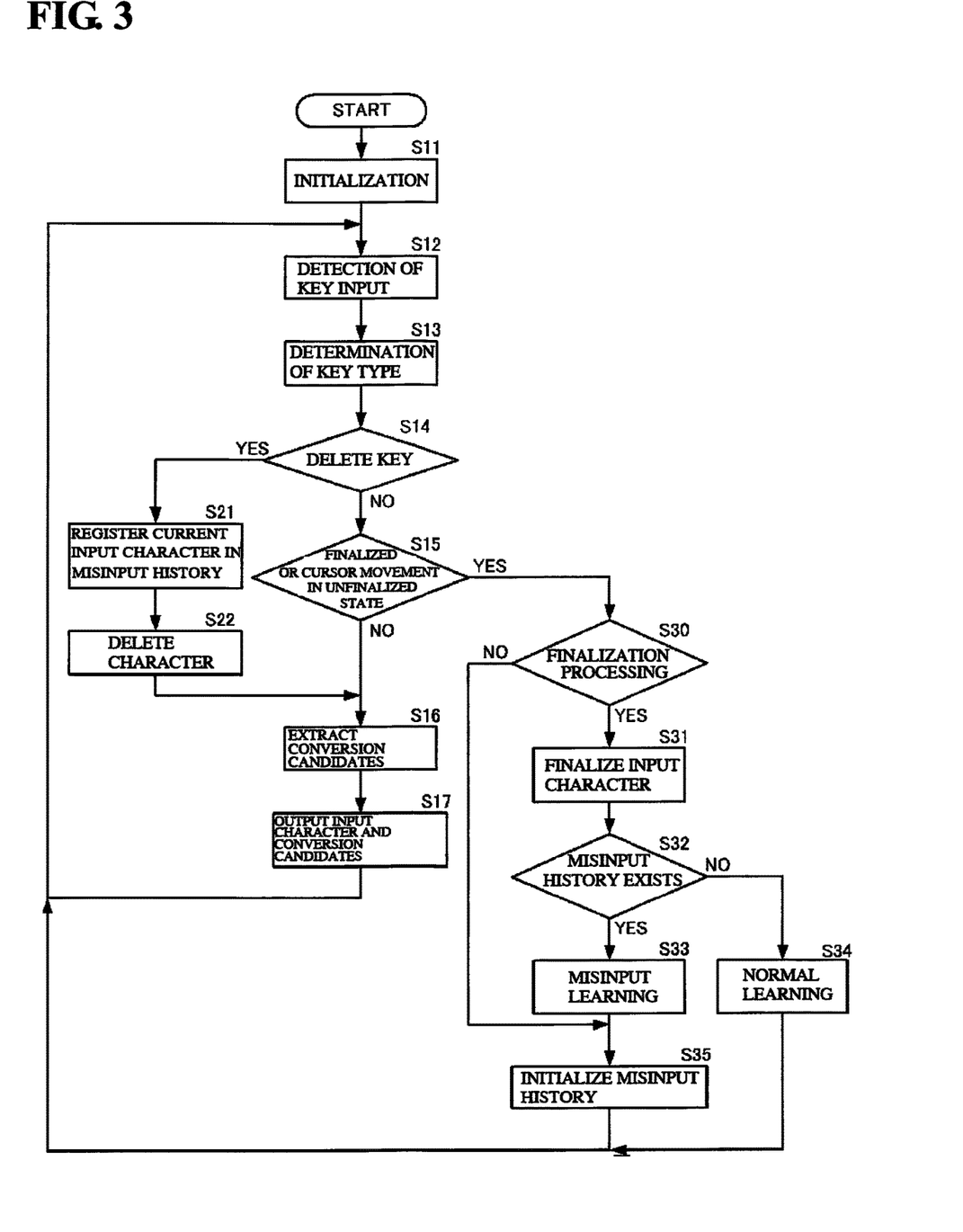
FIG. 3 is a flowchart illustrating a first character input method according to one or more embodiments.

In the abovementioned description, a mode was shown in which the various processing of the character input is realized by functional units excluding the conversion learning database 17 and the input history storage unit 18. However, the various processing described above may be realized and stored in the form of a program, and the program may be executed by a computational processing device such as a CPU. In this case, the character input method shown in the following flowchart need only be used. FIG. 3 is a flowchart of a first character input method according to one or more embodiments. Note that the specific contents of the various processing have been described above, and description of points indicating similar contents will be omitted.

The computational processing device performs initialization of various processing which will be described later at the start of character input (S11). The computational processing device detects key input (S12). The computational processing device determines a key type (S13).

The computational processing device detects whether the input key is the delete key. The computational processing device, when the key type is the delete key (S14: YES), registers the current input character (unfinalized input character) as a misinput history (S21). That is, the computational processing device stores the current input character (unfinalized input character) in the input history storage unit 18. The computational processing device deletes the corresponding character after this registration (S22).

The computational processing device extracts conversion candidates 310 of the new input character after deletion (S16). The computational processing device outputs the input character and conversion candidates 310 to the display unit 11 (S17).

The computational processing device, if the key type is not the delete key (S14: NO), determines whether the input character has been finalized or whether there is movement of the cursor 210 in the unfinalized state (S15).

The computational processing device, if the input character has not been finalized or there is not movement of the cursor 210 (S15: NO), extracts conversion candidates 310 (S16), and outputs the input character and conversion candidates 310 to the display unit 11 (S17).

The computational processing device, if processing for finalizing the input character is being performed (S15: YES and S30: YES), finalizes the input character (S31). Note that finalization processing is detected by input of an OK key or by candidate selection. On the other hand, the computational processing device, if finalization processing is not being executed (S30: NO), that is, if there is movement of the cursor 210 not relating to finalization, initializes the misinput history (S35).

The computational processing device, if there is a misinput history, after finalization of the input character (S32: YES), executes misinput learning, with the input character registered as the misinput history as a reading, and the finalized input character as a conversion candidate 310 (S33). The computational processing device then initializes the misinput history (S35). On the other hand, the computational processing device, if there is not a misinput history (S32: NO), executes known normal learning (S34).

Figure 4:
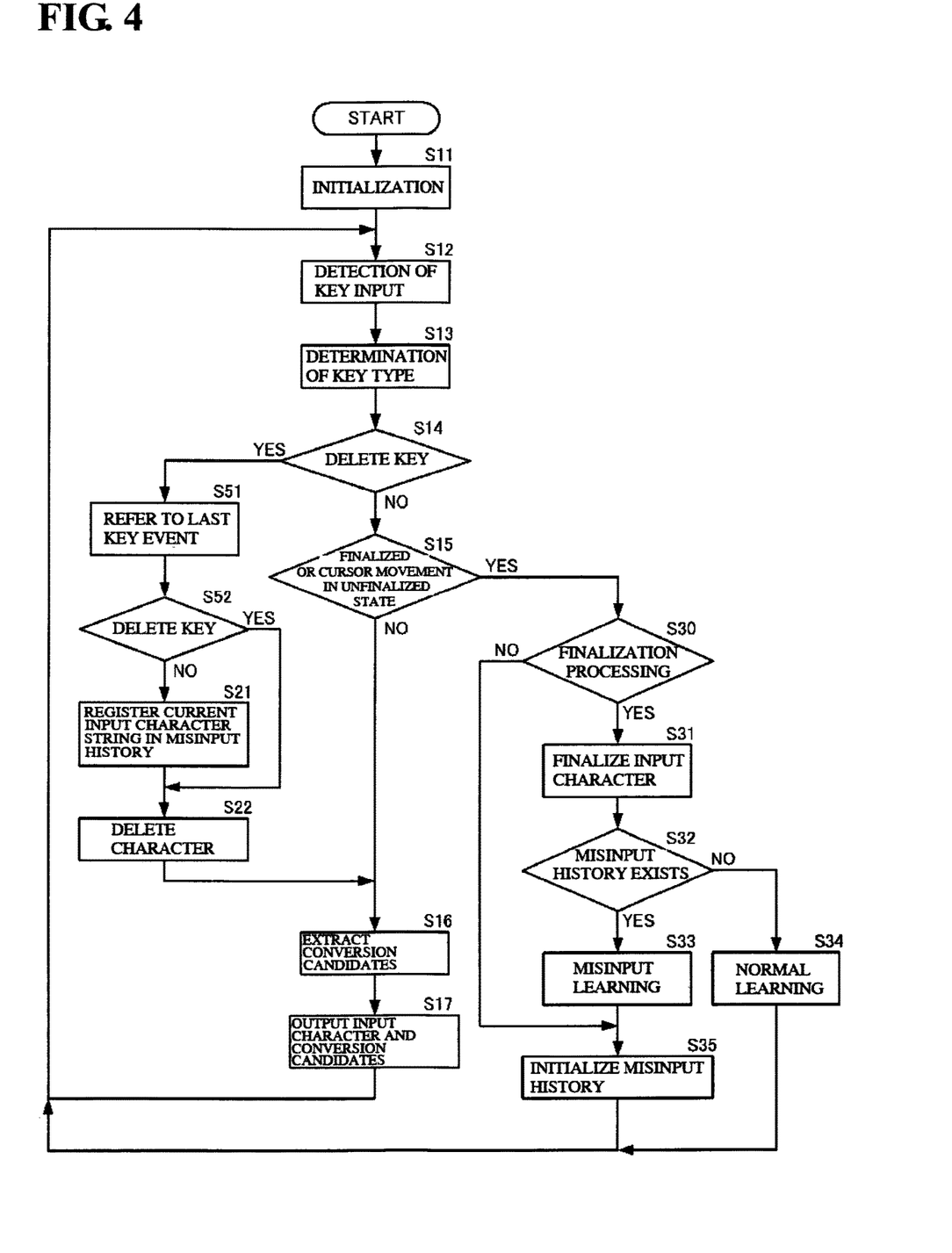
FIG. 4 is a flowchart illustrating a second character input method according to one or more embodiments.

With the character input method shown in the flow of FIG. 3, a misinput history is stored whenever deletion is performed, but the character input method shown in the flow of FIG. 4 can also be used, in consideration of the case where the delete key is input consecutively. FIG. 4 is a flowchart of a second character input method according to one or more embodiments. The character input method shown in FIG. 4 differs from the character input method shown in FIG. 3 in the processing performed when the delete key is input. The character input method shown in FIG. 4 is similar to the character input method shown in FIG. 3 in other respects, and description of similar points will be omitted.

The computational processing device, if the input key is the delete key (S14: YES), refers to the last key event (S51). Note that the last key event can be referred to by storing, for every key event, the content of the key event in the input history storage unit 18.

The computational processing device, if the last key event is not input of the delete key (S52: NO), registers the current input character (unfinalized input character) as a misinput history (S21). The computational processing device then deletes the corresponding character, after this registration (S22).

On the other hand, the computational processing device, if the last key event is input of the delete key (S52: YES), perform only character deletion (S22).

By realizing the abovementioned configuration and processing, various types of learning shown below are executed. Note that each mode described below shows the case where processing was performed based on the flowchart of FIG. 4.

First Mode

Figure 5:
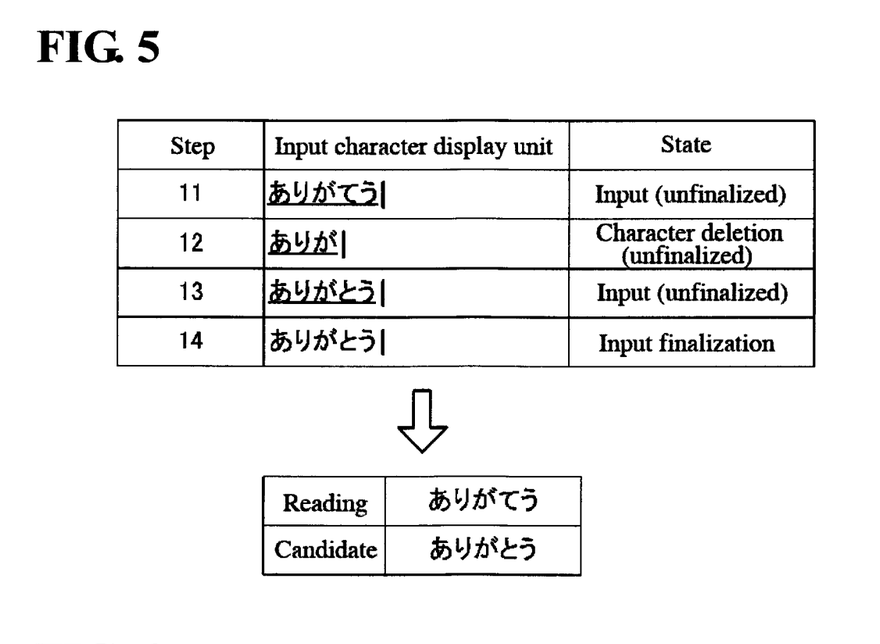
FIG. 5 is a diagram illustrating a first mode of the flow of learning according to one or more embodiments.

FIG. 5 is a diagram showing a first mode of the flow of learning according to one or more embodiments. Steps 11 to 14 shown in FIG. 5 are a series of processing processes that are executed at the time of performing character input with "ありがとう" ("arigatou" (thank you)) as the finalized input character.

As step 11, "ありがとう" ("arigateu") is input ("て" ("te") is misinput). "ありがてう" in step 11 is an unfinalized input character.

As step 12, consecutive deletion of two characters is performed, and the input character becomes "ありが" ("ariga"). "ありが" in step 12 is an unfinalized input character. At this point in time, "ありがとう" of step 11 is stored in the input history storage unit 18.

As step 13, additional character input is performed, and the input character becomes "ありがとう" ("arigatou" (thank you)). "ありがとう" in step 13 is an unfinalized input character.

As step 14, finalization processing is executed, and "ありがとう" becomes a finalized input character. Learning is then executed triggered by this finalization, with "ありがてう" prior to deletion as a reading, and "ありがとう", which is the finalized input character, as a conversion candidate 310.

Second Mode

Figure 6:
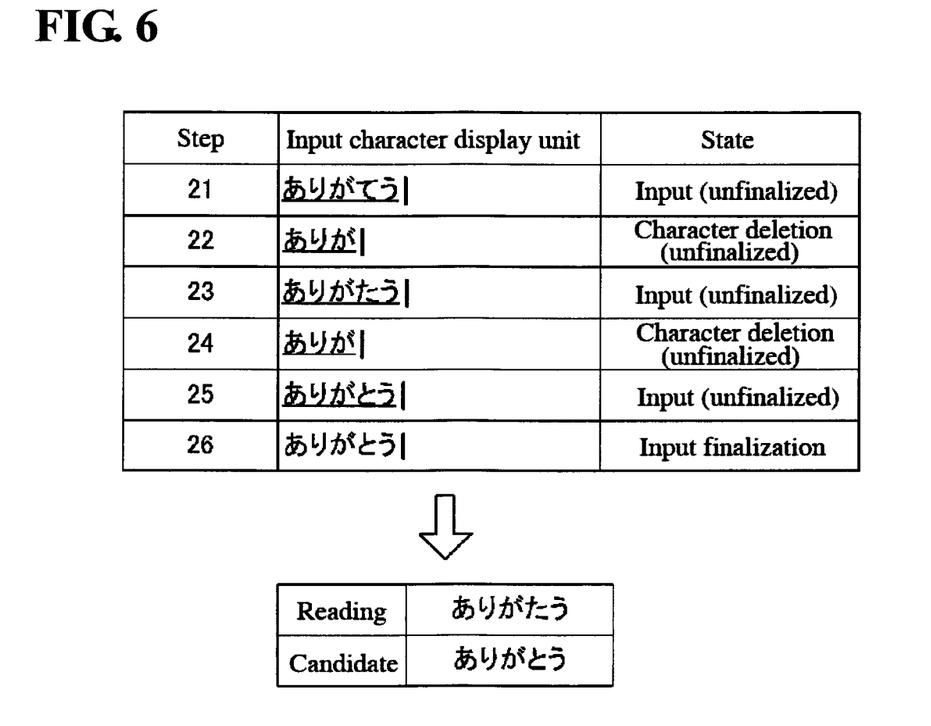
FIG. 6 is a diagram illustrating a second mode of the flow of learning according to one or more embodiments.

FIG. 6 is a diagram showing a second mode of the flow of learning according to one or more embodiments. Steps 21 to 26 shown in FIG. 6 are a series of processing processes that are executed at the time of performing character input with "ありがとう" ("arigatou" (thank you)) as the finalized input character.

As step 21, "ありがてう" ("arigateu") is input ("て" ("te") is misinput). "あり がてう" in step 21 is an unfinalized input character.

As step 22, consecutive deletion of two characters is performed, and the input character becomes "ありが" ("ariga"). "ありが" in step 22 is an unfinalized input character. At this point in time, "ありがてう" of step 21 is stored in the input history storage unit 18.

As step 23, additional character input is performed, and the input character becomes ありがたう" ("arigatau"; "た" ("ta") is misinput). "ありがたう" in step 23 is an unfinalized input character.

As step 24, consecutive deletion of two characters is performed, and the input character becomes "ありが" ("ariga"). "ありが" in step 24 is an unfinalized input character. At this point in time, "ありがたう" of step 21 is stored in the input history storage unit 18 (overwrite update).

As step 25, additional character input is performed, and the input character becomes "ありがとう" ("arigatou" (thank you)). "ありがとう" in step 25 is an unfinalized input character.

As step 26, finalization processing is executed, and "ありがとう" becomes a finalized input character. Learning is then executed triggered by this finalization, with "ありがたう" prior to deletion as a reading, and "ありがとう", which is the finalized input character, as a conversion candidate 310.

With this processing, misinput and deletion are performed in a plurality of steps within a series of processing. In the case where this processing is used, the character stored in the input history storage unit 28 at a timing that is temporally closest to the input timing of a finalized input character will serve as the reading.

Note that, in the abovementioned processing, a misinput character may be added, without performing overwrite update. In this case, a plurality of readings are registered for one conversion candidate 310.

Third Mode

Figure 7:
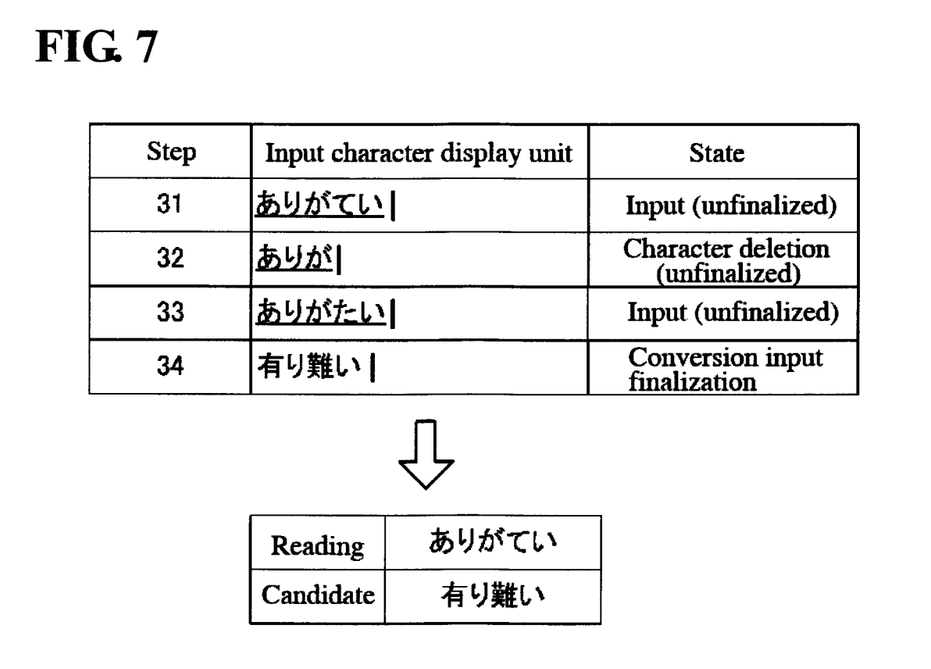
FIG. 7 is a diagram illustrating a third mode of the flow of learning according to one or more embodiments.

FIG. 7 is a diagram showing a third mode of the flow of learning according to one or more embodiments. Steps 31 to 34 shown in FIG. 7 are a series of processing processes that are executed at the time of performing character input with "有り難い" ("arigatai" (thankful)) as the finalized input character.

As step 31, "ありがてい" ("arigatei") is input ("て" ("te") is misinput). "あり 有り難い" in step 31 is an unfinalized input character.

As step 32, consecutive deletion of two characters is performed, and the input character becomes "ありが" ("ariga"). "ありが" in step 32 is an unfinalized input character. At this point in time, "ありがてい" of step 31 is stored in the input history storage unit 18.

As step 33, additional character input is performed, and the input character becomes "ありがてい" ("arigatai" (thankful)). "ありがてい" in step 35 is an unfinalized input character.

As step 26, Chinese character conversion and finalization processing are executed, and "有り難い" becomes a finalized input character. Learning is then executed triggered by this finalization, with "ありがてい" prior to deletion as a reading, and "有り難い", which is the finalized input character, as a conversion candidate 310.

In this processing, Chinese character conversion is performed at the time of input character finalization. In the case where this processing is used, conversion learning using a misinput character is reliably and accurately performed, even when such Chinese character conversion is performed.

Fourth Mode

Figure 8:
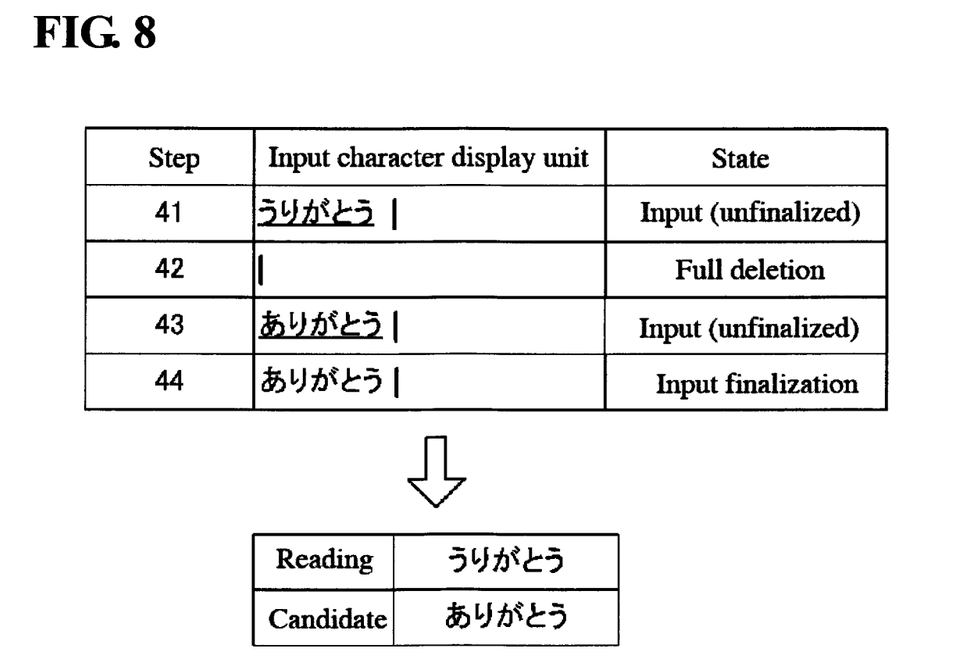
FIG. 8 is a diagram illustrating a fourth mode of the flow of learning according to one or more embodiments.

FIG. 8 is a diagram showing a fourth mode of the flow of learning according to one or more embodiments. Steps 41 to 44 shown in FIG. 8 are a series of processing processes that are executed at the time of performing character input with "ありがとう" ("arigatou" (thank you)) as the finalized input character.

As step 41, "うりがとう" ("urigatou") is input ("う" ("u") is misinput). "うり がとう" in step 21 is an unfinalized input character.

As step 42, full deletion is performed. At this point in time, "うりがとう" of step 42 is stored in the input history storage unit 18.

As step 43, additional character input is performed, and the input character becomes "ありがとう" ("arigatou" (thank you)). "ありがとう" in step 43 is an unfinalized input character.

As step 44, finalization processing is executed, and "ありがとう" becomes a finalized input character. Learning is then executed triggered by this finalization, with "うりがとう" prior to deletion as a reading, and "ありがとう", which is the finalized input character, as a conversion candidate 310.

In this processing, full deletion is performed within the series of processing. In the case where this processing is used, conversion learning using a misinput character is reliably and accurately performed, even when such full deletion is performed.

Fifth Mode

Figure 9:
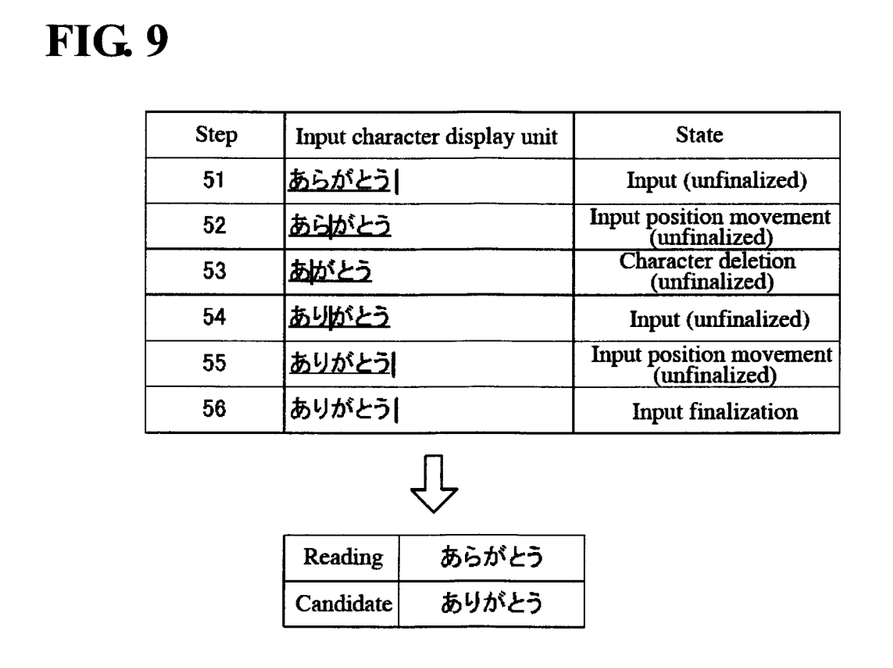
FIG. 9 is a diagram illustrating a fifth mode of the flow of learning according to one or more embodiments.

FIG. 9 is a diagram showing a fifth mode of the flow of learning according to one or more embodiments. Steps 51 to 56 shown in FIG. 9 are a series of processing processes that are executed at the time of performing character input with "ありがとう" ("arigatou" (thank you)) as the finalized input character.

As step 51, "ありがとう" ("aragatou") is input ("う" ("ra") is misinput). "あ らがとう" in step 51 is an unfinalized input character.

As step 52, movement of the input position is executed. The cursor 210 is thereby positioned between "う" ("ra") and "が" ("ga").

As step 53, deletion of one character is performed, and the input character becomes "あがとう" ("agatou"). "あがとう" in step 53 is an unfinalized input character. At this point in time, "ありがとう" of steps 51 and 52 is stored in the input history storage unit 18.

As step 54, additional character input is performed, and the input character becomes "ありがとう" ("arigatou" (thank you)). "ありがとう" in step 54 is an unfinalized input character.

As step 55, movement of the input position is executed. The cursor 210 is thereby in the next position to "う" ("u").

As step 56, finalization processing is executed, and "ありがとう" becomes a finalized input character. Learning is then executed triggered by this finalization, with "ありがとう" prior to deletion as a reading, and "ありがとう", which is the finalized input character, as a conversion candidate 310.

In this processing, movement of the character input position is performed within the series of processing. Conversion learning using a misinput character is reliably and accurately performed, even when such movement of the character input position is performed.

Sixth Mode

Figure 10:
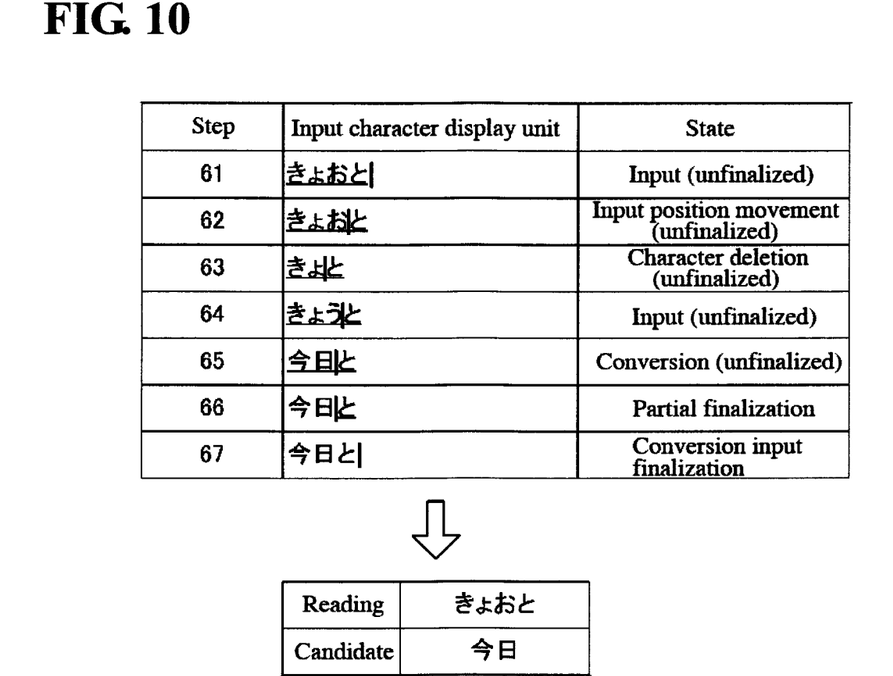
FIG. 10 is a diagram illustrating a sixth mode of the flow of learning according to one or more embodiments.

FIG. 10 is a diagram showing a sixth mode of the flow of learning according to one or more embodiments. Steps 61 to 67 shown in FIG. 10 are a series of processing processes that are executed at the time of performing character input with "あがとう" ("kyou to" (today and)) as the finalized input character.

As step 61, "きょおと" ("kyoo to") is input ("お" ("o") is misinput). "きょおと" in step 61 is an unfinalized input character.

As step 62, movement of the input position is executed. The cursor 210 is thereby positioned between "お" ("o") and "と" ("to").

As step 63, deletion of one character is performed and the input character becomes "きょと" ("kyo to"). "きょと" in step 63 is an unfinalized input character. At this point in time, "きょおと" of steps 61 and 62 is stored in the input history storage unit 18.

As step 64, additional character input is performed, and the input character becomes "きょうと" ("kyou to" (today and)). "きょうと" in step 64 is an unfinalized input character.

As step 65, Chinese character conversion is performed, and the input character becomes "今日と", "今日と" in step S65 is an unfinalized input character.

As step 66, partial finalization processing is executed, and "今日" becomes a finalized input character, with "と" remaining as an unfinalized input character.

As step 67, finalization processing is executed, and "今日と" becomes a finalized input character. Learning is then executed triggered by this finalization, with "きょおと" prior to deletion as a reading, and "今日と", which is the finalized input character, as a conversion candidate 310.

In this processing, partial finalization is performed within the series of processing. Conversion learning using a misinput character is reliably and accurately performed, even when such partial finalization is performed.

Figure 11:
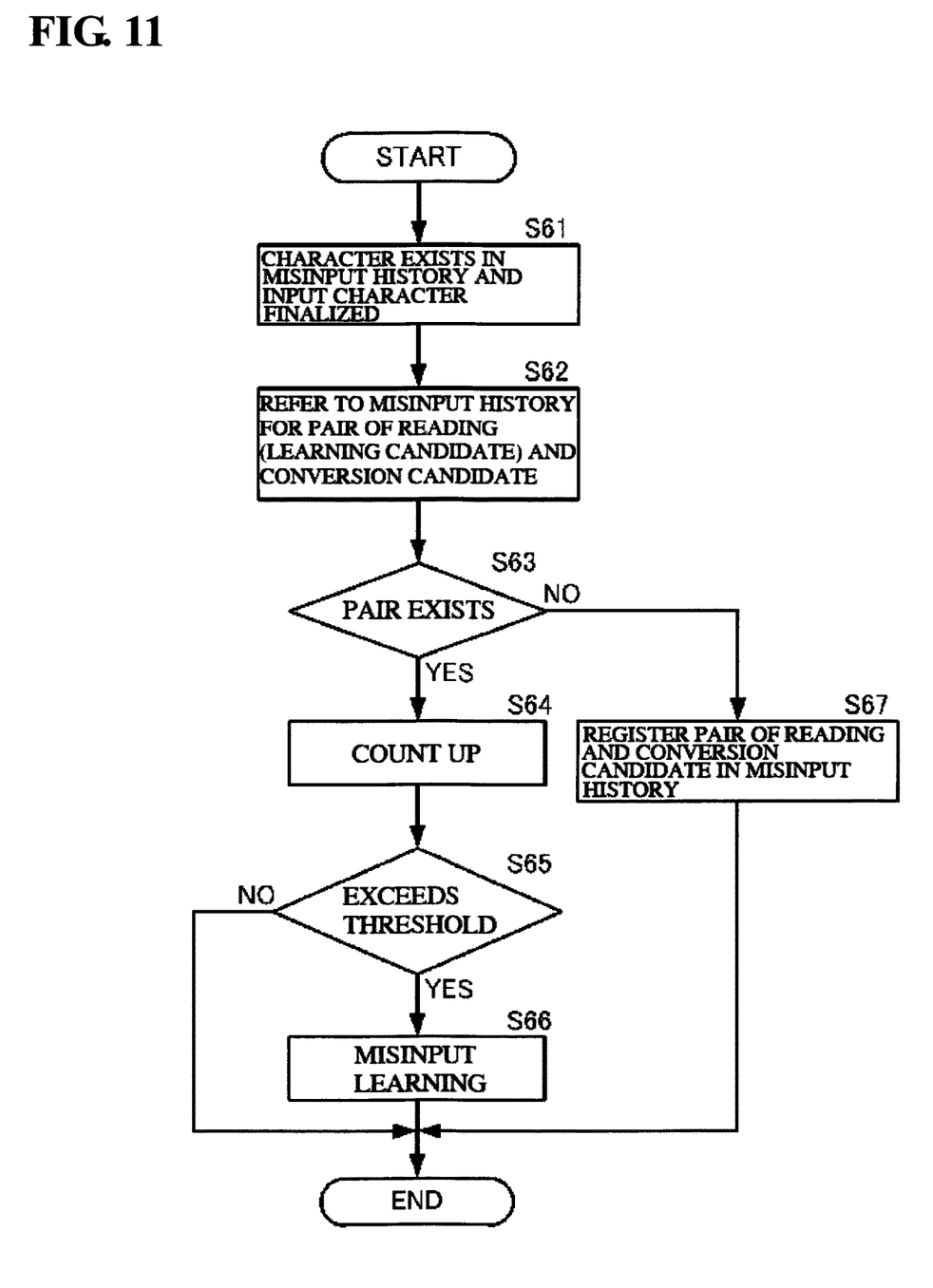
FIG. 11 is a flowchart illustrating a third character input method according to one or more embodiments.

In the above description, registration as a conversion candidate 310 is performed when misinput arises even once, but a configuration may be adopted in which conversion learning is only performed in the case where the same misinput is performed a plurality of times. FIG. 11 is a flowchart of a third character input method according to one or more embodiments. Note that although, in FIG. 11, only the main processing of the third character input method is described, and description of the relationship with the processing shown in FIGS. 3 and 4 is omitted, the method shown in FIG. 11 is linked to the methods shown in FIGS. 3 and 4.

The computational processing device detects that there is a character in the misinput history, and that an input character has been finalized (S61). The computational processing device refers to the input history storage unit 18, and detects whether the pair of a reading, which is a learning candidate, and a conversion candidate 310 is stored (S62).

The computational processing device, if a current input character and a pair that is stored in the input history storage unit 18 exist (S63: YES), count up the number of times there is a match (S64). On the other hand, the computational processing device, if a current input character and a pair that is stored in the input history storage unit 18 do not exist (S63: NO), registers the pair of the reading and the conversion candidate 310 in the input history storage unit 18 (S67).

The computational processing device, if the count value exceeds a threshold value (S65: YES), executes misinput learning with the misinput character as the reading (S66). The computational processing device, if the count value does not exceed the threshold value (S65: NO), defers misinput learning.

By performing such processing, conversion learning can be limited to characters that the user tends to misinput, and conversion learning is not performed on misinput characters that occur unexpectedly. Accordingly, more user-friendly character input becomes possible.

Note that the conversion candidate 310 resulting from a misinput character may be third to fifth in the range of priorities. It is possible to use the reading of a learned misinput character as the reading of a character having a different meaning from the learned conversion candidate 310, and using this method allows user-friendliness to be improved without conversion candidates being displayed with high priority.

The invention claimed is:

1. A character input device, comprising a processor configured with a program to perform operations comprising:
   operation as an input key determination unit configured to determine a type of a key that is input;
   operation as an input character processing unit configured to execute an operation on an input character based on the determined type of the key that is input, and to perform finalization of the input character based on the determined type of the key that is input; and
   operation as a conversion candidate processing unit configured to execute learning of a conversion candidate associated with the input character, wherein, in response to detecting that finalization of the input character has been performed, and that the type of the key input before performing the finalization of the input character was a delete key, the conversion candidate processing unit sets an input character existing prior to the detected input of the delete key as a reading of the finalized input character and executes the learning to set the reading of the finalized input character as a learned conversion candidate.

2. The character input device according to claim 1, wherein the processor is configured with the program to perform operations comprising operations such that the conversion candidate processing unit sets, as the reading of the finalized input character, an input character existing immediately prior to a last detected input of the delete key before the finalization of the input character.

3. The character input device according to claim 1, wherein
the processor is configured with the program to perform operations further comprising operation as an input history storage unit configured to store, after performing the input finalization, the input character existing prior to the detected input of the delete key, and
the processor is configured with the program to perform operations comprising operations such that the conversion candidate processing unit detects whether the input character existing prior to the detected input of the delete key matches a character in the input history storage unit, and executes the learning to set the reading of the finalized input character as the learned conversion candidate, when a number of matches of the input character existing prior to the detected input of the delete key and characters in the input history storage unit exceeds a threshold value.

4. The character input device according to claim 2, wherein
the processor is configured with the program to perform operations further comprising operation as an input history storage unit configured to store, after performing the input finalization, an input character existing prior to the detected input of the delete key, and
the processor is configured with the program to perform operations comprising operations such that the conversion candidate processing unit detects whether the input character existing prior to input of the delete key matches a character in the input history storage unit, and executes the learning to set the reading of the finalized input character as the learned conversion candidate, when a number of matches of the input character existing prior to the input of the delete key and characters in the input history storage unit exceeds a threshold value.

5. The character input device according to claim 1, wherein
the processor is configured with the program to perform operations further comprising operation as an input history storage unit configured to store an input character existing prior to input of the delete key, and
the processor is configured with the program to perform operations comprising operations such that the conversion candidate processing unit executes the learning to set the reading of the character stored in the input history storage unit as the learned conversion candidate, when the finalization of the input character is performed.

6. The character input device according to claim 2, wherein
the processor is configured with the program to perform operations further comprising operation as an input history storage unit configured to store an input character existing prior to input of the delete key, and
the processor is configured with the program to perform operations comprising operations such that the conversion candidate processing unit executes the learning to set the reading of the character stored in the input history storage unit as the learned conversion candidate, when the finalization of the input character is performed.

7. The character input device according to claim 3, wherein
the processor is configured with the program to perform operations further comprising operation as an input history storage unit configured to store an input character existing prior to input of the delete key, and
the processor is configured with the program to perform operations comprising operations such that the conversion candidate processing unit executes the learning to set the reading of the character stored in the input history storage unit as the learned conversion candidate, when the finalization of the input character is performed.

8. The character input device according to claim 4, wherein
the processor is configured with the program to perform operations further comprising operation as an input history storage unit configured to store an input character existing prior to input of the delete key, and
the processor is configured with the program to perform operations comprising operations such that the conversion candidate processing unit executes the learning to set the reading of the character stored in the input history storage unit as the learned conversion candidate, when the finalization of the input character is performed.

9. The character input device according to claim 1, wherein
the processor is configured with the program to perform operations further comprising operation as a conversion learning database configured to store the input character and the conversion candidate, and
the processor is configured with the program to perform operations comprising operations such that the conversion candidate processing unit stores the input character existing prior to input of the delete key as the reading and stores the finalized input character as the conversion candidate in the conversion learning database, in association with each other.

10. The character input device according to claim 2, wherein
the processor is configured with the program to perform operations further comprising operation as a conversion learning database configured to store the input character and the conversion candidate, and
the processor is configured with the program to perform operations comprising operations such that the conversion candidate processing unit stores the input character existing prior to input of the delete key as the reading and stores the finalized input character as the conversion candidate in the conversion learning database, in association with each other.

11. The character input device according to claim 3, wherein
   the processor is configured with the program to perform operations further comprising operation as a conversion learning database configured to store the input character and the conversion candidate, and
   the processor is configured with the program to perform operations comprising operations such that the conversion candidate processing unit stores the input character existing prior to input of the delete key as the reading and stores the finalized input character as the conversion candidate in the conversion learning database, in association with each other.

12. The character input device according to claim 4, wherein
   the processor is configured with the program to perform operations further comprising operation as a conversion learning database configured to store the input character and the conversion candidate, and
   the processor is configured with the program to perform operations comprising operations such that the conversion candidate processing unit stores the input character existing prior to input of the delete key as the reading and stores the finalized input character as the conversion candidate in the conversion learning database, in association with each other.

13. The character input device according to claim 5, wherein
   the processor is configured with the program to perform operations further comprising operation as a conversion learning database configured to store the input character and the conversion candidate, and
   the processor is configured with the program to perform operations comprising operations such that the conversion candidate processing unit stores the input character existing prior to input of the delete key as the reading and stores the finalized input character as the conversion candidate in the conversion learning database, in association with each other.

14. The character input device according to claim 6, wherein
   the processor is configured with the program to perform operations further comprising operation as a conversion learning database configured to store the input character and the conversion candidate, and
   the processor is configured with the program to perform operations comprising operations such that the conversion candidate processing unit stores the input character existing prior to input of the delete key as the reading and stores the finalized input character as the conversion candidate in the conversion learning database, in association with each other.

15. The character input device according to claim 7, wherein
   the processor is configured with the program to perform operations further comprising operation as a conversion learning database configured to store the input character and the conversion candidate, and
   the processor is configured with the program to perform operations comprising operations such that the conversion candidate processing unit stores the input character existing prior to input of the delete key as the reading and stores the finalized input character as the conversion candidate in the conversion learning database, in association with each other.

16. The character input device according to claim 8, wherein
   the processor is configured with the program to perform operations further comprising operation as a conversion learning database configured to store the input character and the conversion candidate, and
   the processor is configured with the program to perform operations comprising operations such that the conversion candidate processing unit stores the input character existing prior to input of the delete key as the reading and stores the finalized input character as the conversion candidate in the conversion learning database, in association with each other.

17. A character input method according to which a computational processing device performs operations comprising:
   determining a type of a key input;
   executing an operation on an input character based on the determined type of the key input, and performing finalization the input character based on the determined type of the key input; and
   learning a conversion candidate associated with the input character,
   wherein the learning of the conversion candidate comprises setting as a reading of the finalized input character, an input character existing prior to input of the delete key, and learning to set the reading of the finalized input character as a learned conversion candidate in response to detecting that finalization of the input character has been performed, and that the type of the key input before performing the finalization of the input character was a delete key.

18. A non-transitory computer-readable recording medium storing a character input program causing a computational processing device to perform operations comprising:
   determining a type of a key that is input;
   executing an operation on an input character based on the determined type of the key input, and performing finalization of the input character based on the determined type of the key input; and
   executing learning of a conversion candidate associated with the input character, wherein, in executing the learning of the conversion candidate, in response to detecting that the finalization of the input character has been performed, and that the type of the key input before performing the finalization of the input character was a delete key, the computational processing device is caused to execute processing for setting an input character existing prior to input of the delete key as a reading of the finalized input character and executes the learning to set the reading of the finalized input character as a learned conversion candidate.

19. A character input device, comprising:
   an input key determination unit configured to determine a type of a key that is input;
   an input character processing unit configured to execute an operation, when the type of the key is a character key, to add a character corresponding to the character key to an unfinalized input character, and when the type of the key is a delete key, to delete a part of the unfinalized input character; and
   a conversion candidate processing unit configured to execute learning of a conversion candidate associated with a reading; wherein
   the input character processing unit is further configured to execute finalization processing in which the unfinalized input character is finalized to a finalized input character, the reading of which is the unfinalized input character; and the conversion candidate processing unit is further configured to execute the learning in which the unfinalized input character before inputting the delete key is set to the reading of the finalized input character, when the input of the delete key is detected before the finalization processing is executed.

20. The character input device according to claim 1, wherein
the conversion candidate processing unit executes the learning in which the unfinalized input character before inputting the last input delete key is sets to the reading of the finalized input character.

21. The character input device according to claim 1, further comprising:
an input history storage unit, when the type of the key is determined to be the delete key by the determination unit, stores the unfinalized input character before the inputting the delete key.

22. The character input device according to claim 3, wherein
the input history storage unit, when the finalized input character is finalized by the finalization processing, stores the unfinalized input character before inputting the delete key and the finalized input character finalized by the finalization processing as a pair, and,
the conversion candidate processing unit, in case that the number of the pairs in which the unfinalized input character coincides with the finalized input character stored in the input history storage unit exceeds a threshold value, executes the learning to the pairs.

23. The character input device according to claim 1, further comprising:
a conversion learning database configured to store the reading and the conversion candidate associated with each other, wherein
the conversion candidate processing unit stores the unfinalized input character existing prior to input of the delete key as the reading and the finalized input character which is finalized by the finalization processing as the conversion candidate in the conversion learning database in association with each other.

24. A character input method according to which a computational processing device performs operations comprising:
determining a type of a key that is input;
in response to the type of the key being a character key, adding a character corresponding to the character key to an unfinalized input character, and in response to the type of the key being a delete key, deleting a part of the unfinalized input character;
learning a conversion candidate associated with a reading; and
executing finalization processing in which the unfinalized input character is finalized to a finalized input character, the reading of which is the unfinalized input character, wherein
learning the conversion candidate associated with the reading further comprises setting the unfinalized input character before inputting the delete key to the reading of the finalized input character, in response to the input of the delete key being detected before the finalization processing is executed.

25. A non-transitory computer-readable recording medium storing a character input program causing a computational processing device to perform operations comprising:
determining a type of a key that is input;
in response to the type of the key being a character key, adding a character corresponding to the character key to an unfinalized input character, and in response to the type of the key being a delete key, deleting a part of the unfinalized input character;
learning a conversion candidate associated with a reading; and
executing finalization processing in which the unfinalized input character is finalized to a finalized input character, the reading of which is the unfinalized input character, wherein
learning the conversion candidate associated with the reading further comprises setting the unfinalized input character before inputting the delete key to the reading of the finalized input character, in response to the input of the delete key being detected before the finalization processing is executed.

* * * * *